(12) United States Patent
Li et al.

(10) Patent No.: US 12,149,649 B2
(45) Date of Patent: Nov. 19, 2024

(54) DRIVING CONTROL MODULE, DRIVING CONTROL METHOD, DOUBLE-LAYER PANEL, AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Pengtao Li, Beijing (CN); Rui Han, Beijing (CN); Jie Yu, Beijing (CN); Qing Ma, Beijing (CN); Daekeun Yoon, Beijing (CN); Dong Cui, Beijing (CN); Li Tian, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 158 days.

(21) Appl. No.: 17/904,181

(22) PCT Filed: Aug. 12, 2021

(86) PCT No.: PCT/CN2021/112229
§ 371 (c)(1),
(2) Date: Aug. 12, 2022

(87) PCT Pub. No.: WO2022/057530
PCT Pub. Date: Mar. 24, 2022

(65) Prior Publication Data
US 2023/0067469 A1    Mar. 2, 2023

(30) Foreign Application Priority Data
Sep. 16, 2020  (CN) .......................... 202010974951.4

(51) Int. Cl.
*H04M 1/02*    (2006.01)

(52) U.S. Cl.
CPC ....... *H04M 1/0266* (2013.01); *H04M 1/0249* (2013.01)

(58) Field of Classification Search
CPC .................................................. H04M 1/0266
(Continued)

(56) References Cited

U.S. PATENT DOCUMENTS

2013/0009894 A1  1/2013  Wang et al.
2014/0320446 A1  10/2014  Kim et al.
(Continued)

FOREIGN PATENT DOCUMENTS

CN    102880325 A    1/2013
CN    103176655 A    6/2013
(Continued)

OTHER PUBLICATIONS

China National Intellectual Property Administration, Office Action and Search Report Issued in Application No. 202010974951.4, Jul. 22, 2023, 8 pages. (Submitted with Partial Translation).
(Continued)

*Primary Examiner* — Charles S Chang
(74) *Attorney, Agent, or Firm* — McCoy Russell LLP

(57) ABSTRACT

The present disclosure provides a driving control module, a driving control method, a double-layer panel, and a display device. The driving control module is applied to the double-layer panel, the double-layer panel includes a first panel and a second panel, the first panel is a touch display panel, the second panel is a display panel, and the driving control module includes a control circuitry. The control circuitry is electrically coupled to the first panel and the second panel, and configured to control a touch stage of the first panel to be arranged within a spacing stage of the second panel, the
(Continued)

first panel is configured to perform touch detection in the touch stage, and the spacing stage includes at least one of a scanning blank stage, a frame start time of image display time period, and a frame end time of the image display time period.

17 Claims, 9 Drawing Sheets

(58) Field of Classification Search
USPC .......................................................... 349/12
See application file for complete search history.

(56) References Cited

U.S. PATENT DOCUMENTS

2014/0347297 A1* 11/2014 Tsuji ..................... G06F 3/0412
                                                              345/173
2015/0301676 A1    10/2015  Xu et al.
2018/0203278 A1    7/2018   Li et al.
2019/0179456 A1    6/2019   Kim et al.
2021/0191547 A1    6/2021   Hsu et al.

FOREIGN PATENT DOCUMENTS

| CN | 106094312 A | 11/2016 |
| CN | 106201151 A | 12/2016 |
| CN | 208569611 U | 3/2019 |
| CN | 110174969 A | 8/2019 |
| CN | 111078051 A | 4/2020 |

OTHER PUBLICATIONS

ISA China National Intellectual Property Administration, International Search Report and Written Opinion Issued in Application No. PCT/CN2021/112229, Nov. 11, 2021, WIPO, 13 pages. (Submitted with Partial Translation).

* cited by examiner

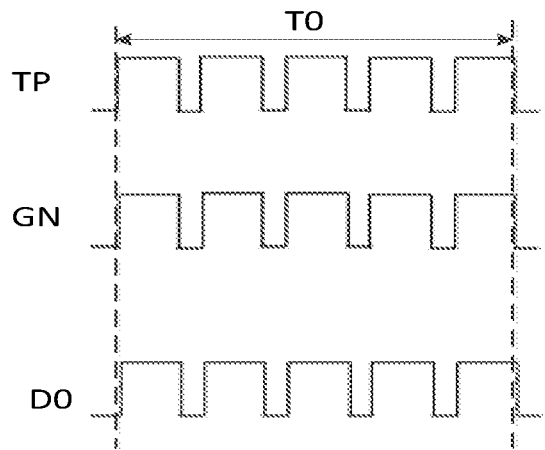

Fig. 11

| outputting, by a first driving control sub-circuitry, a touch indication signal in accordance with a touch state of a first panel | S1 |

↓

| receiving, by a control sub-circuitry, the touch indication signal, providing, by the control sub-circuitry, a driving stop control signal to a second driving control sub-circuitry when the touch indication signal indicates the first panel to enter the touch stage, and providing, by the control sub-circuitry, a driving control signal to the second driving control sub-circuitry when the touch indication signal indicates the first panel to enter a display stage | S2 |

↓

| controlling, by the second driving control sub-circuitry, to stop scanning all the gate lines in the second panel in response to the driving stop control signal, recording a serial number N of a last scanned gate line in the second panel before the driving stop control signal is received, and controlling, by the second driving control sub-circuitry, to continue scanning from an $(N+1)^{th}$ gate line in the second panel in response to the driving control signal | S3 |

Fig. 12

DRIVING CONTROL MODULE, DRIVING CONTROL METHOD, DOUBLE-LAYER PANEL, AND DISPLAY DEVICE

CROSS-REFERENCE TO RELATED APPLICATION

The present application is a U.S. National Phase of International Application No. PCT/CN2021/112229, entitled "DRIVE CONTROL MODULE, DRIVE CONTROL METHOD, DUAL-LAYER PANEL, AND DISPLAY DEVICE", and filed on Aug. 12, 2021. International Application No. PCT/CN2021/112229 claims priority to Chinese Patent Application No. 202010974951.4 filed on Sep. 16, 2020. The entire contents of the above-listed applications are hereby incorporated by reference for all purposes.

TECHNICAL FIELD

The present disclosure relates to the field of touch display technology, in particular to a driving control module, a driving control method, a double-layer panel, and a display device.

BACKGROUND

In a conventional double-layer panel, a first panel is a touch display panel, and a second panel is a display panel. As shown in FIG. 1, the first panel 71 and the second panel 72 are bonded to each other through an adhesive. The first panel 71 and the second panel 72 are close to each other, so a capacitor is formed between the first panel 71 and the second panel 72. When a voltage applied to the second panel 72 changes, a voltage applied to the first panel also changes due to capacitance coupling. When the voltages applied to the second panel 72 changes differently in different regions, different capacitance coupling occurs for the first panel 71 in different regions. A touch detection principle of the first panel 71 is to obtain touch coordinates through detecting the change in the voltage. The touch accuracy of the first panel 71 is greatly affected by the second panel 72 during the touch detection, and even malfunction may occur for the first panel 71.

SUMMARY

In one aspect, the present disclosure provides in some embodiments a driving control module for a double-layer panel, the double-layer panel including a first panel and a second panel, the first panel being a touch display panel, the second panel being a display panel, and the driving control module including a control circuitry. The control circuitry is electrically coupled to the first panel and the second panel, and configured to control a touch stage of the first panel to be arranged within a spacing stage of the second panel, the first panel is configured to perform touch detection in the touch stage, and the spacing stage includes at least one of a scanning blank stage, a frame start time of an image display time period, and a frame end time of the image display time period.

In a possible embodiment of the present disclosure, the spacing stage includes the scanning blank stage, the scanning blank stage includes an inter-frame blank time period, and the control circuitry is configured to control the first panel to perform the touch detection in the touch stage in an inter-frame blank time period of the first panel and control the inter-frame blank time period of the first panel to at least partially overlap the inter-frame blank time period of the second panel.

In a possible embodiment of the present disclosure, the control circuitry is configured to control a refresh rate of the first panel to be the same as a refresh rate of the second panel, and control frame synchronization between the first panel and the second panel.

In a possible embodiment of the present disclosure, the control circuitry is specifically configured to control the inter-frame blank time period of the first panel to coincide with the inter-frame blank time period of the second panel, so as to enable the touch stage of the first panel to be arranged within the inter-frame blank time period of the second panel.

In a possible embodiment of the present disclosure, the control circuitry is specifically configured to control a time interval between a scanning start time of the first panel and a scanning start time of the second panel to be less than or equal to a first error time, and the spacing stage includes the frame start time of the image display time period or the frame end time of the image display time period.

In a possible embodiment of the present disclosure, a ratio of the first error time to the image display time period is less than or equal to 0.05.

In a possible embodiment of the present disclosure, a ratio of a duration of the touch stage to a duration of the inter-frame blank time period is greater than or equal to 0.2 and less than or equal to 0.6, the touch stage is arranged within the inter-frame blank time period of the first panel, and a ratio of a time difference between a start time of the touch stage and a start time of the inter-frame blank time period to the duration of the inter-frame blank time period is less than or equal to 0.4.

In a possible embodiment of the present disclosure, the control circuitry is specifically configured to control the second panel to stop display driving when the first panel performs the touch detection.

In a possible embodiment of the present disclosure, the control circuitry is further configured to control the second panel to continue displaying a current image when the first panel performs the touch detection and control to continue scanning the second panel from a gate line to be scanned in the second panel when the first panel enters a display stage, and the gate line to be scanned is a gate line next to a last scanned gate line in the second panel before the first panel performs the touch detection.

In a possible embodiment of the present disclosure, the control circuitry includes a first driving control sub-circuitry, a control sub-circuitry and a second driving control sub-circuitry. The first driving control sub-circuitry is electrically coupled to the first panel and configured to output a touch indication signal in accordance with a touch state of the first panel. The control sub-circuitry is electrically coupled to the first driving control sub-circuitry and the second driving control sub-circuitry, and configured to receive the touch indication signal, provide a driving stop control signal to the second driving control sub-circuitry when the touch indication signal indicates the first panel to enter the touch stage, and provide a driving control signal to the second driving control sub-circuitry when the touch indication signal indicates the first panel to enter the display stage. The second driving control sub-circuitry is electrically coupled to the second panel, and configured to control to stop scanning all gate lines in the second panel in response to the received driving stop control signal, record a serial number N of the last scanned gate line in the second panel before the reception of the driving stop control signal, and control to continue scanning from an (N+1)$^{th}$ gate line in the second panel in response to the driving control signal, where N is a positive integer.

In a possible embodiment of the present disclosure, the second driving control sub-circuitry is specifically configured to, in response to the driving stop control signal, control to provide a first voltage signal to all the gate lines in the second panel to control to stop scanning all the gate lines, and control to stop providing a data voltage to all data lines in the second panel.

In a possible embodiment of the present disclosure, the first voltage signal is a direct current voltage signal.

In a possible embodiment of the present disclosure, the second driving control sub-circuitry is specifically configured to, in response to the driving stop control signal, control to provide a predetermined gate driving signal to all the gate lines in the second panel, and control to provide a predetermined voltage signal to all data lines in the second panel, the predetermined gate driving signal is a signal generated through superposing a second voltage signal on the touch driving signal, the predetermined voltage signal is a signal generated through superposing a third voltage signal on the touch driving signal, and the touch driving signal is a signal on a touch driving line in the first panel when the first panel is in the touch state.

In a possible embodiment of the present disclosure, the second voltage signal and the third voltage signal are direct current voltage signals.

In a possible embodiment of the present disclosure, the first driving control sub-circuitry is specifically configured to continuously detect the touch state of the first panel after the first panel has been started.

In a possible embodiment of the present disclosure, the control circuitry is further configured to control the first panel to be started and control the second panel to be started after the first panel has been started when the double-layer panel is started.

In another aspect, the present disclosure provides in some embodiments a driving control method for the above-mentioned driving control module, including controlling, by the control circuitry, the touch stage of the first panel to be arranged within the spacing stage of the second panel. The spacing stage includes at least one of the scanning blank stage, the frame start time of the image display time period, and the frame end time of the image display time period.

In a possible embodiment of the present disclosure, the spacing stage includes the scanning blank stage, the scanning blank stage includes the inter-frame blank time period, and the driving control method further includes controlling, by the control circuitry, the first panel to perform the touch detection in the touch stage in the inter-frame blank time period of the first panel, and controlling the inter-frame blank time period of the first panel to at least partially overlap the inter-frame blank time period of the second panel.

In a possible embodiment of the present disclosure, the driving control method further includes controlling, by the control circuitry, the refresh rate of the first panel to be the same as the refresh rate of the second panel, and controlling the frame synchronization between the first panel and the second panel.

In a possible embodiment of the present disclosure, the driving control method further includes controlling, by the control circuitry, the second panel to stop display driving when the first panel performs the touch detection.

In a possible embodiment of the present disclosure, the driving control method further includes controlling, by the control circuitry, the second panel to continue displaying a current image when the first panel performs the touch detection and controlling, by the control circuitry, to continue scanning the second panel from a gate line to be scanned in the second panel when the first panel enters a display stage, and the gate line to be scanned is a gate line after a last scanned gate line in the second panel before the first panel performs the touch detection.

In yet another aspect, the present disclosure provides in some embodiments a double-layer panel including the above-mentioned driving control module.

BRIEF DESCRIPTION OF THE DRAWINGS

FIG. 11 is a waveform diagram showing the gate driving signals on the gate lines when the touch stage T0 is arranged between display time of two frames of images;

FIG. 12 is a flow chart of a driving control method according to one embodiment of the present disclosure.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

All transistors adopted in the embodiments of the present disclosure may be triodes, thin film transistors (TFT), field effect transistors (FETs) or any other elements having an identical characteristic. In order to differentiate two electrodes other than a control electrode from each other, one of the two electrodes is called as first electrode and the other is called as second electrode.

In actual use, when the transistor is a triode, the control electrode may be a base, the first electrode may be a collector and the second electrode may be an emitter, or the control electrode may be a base, the first electrode may be an emitter and the second electrode may be a collector.

In actual use, when the transistor is a TFT or FET, the control electrode may be a gate electrode, the first electrode may be a drain electrode and the second electrode may be a source electrode, or the control electrode may be a gate electrode, the first electrode may be a source electrode and the second electrode may be a drain electrode.

Figure 1:
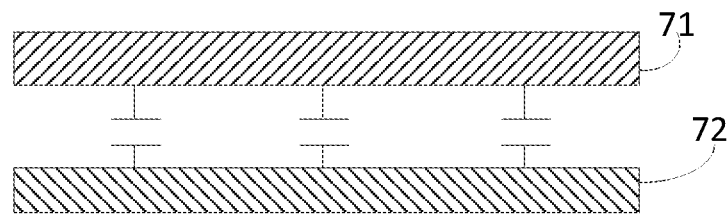
FIG. 1 is a schematic view showing a conventional double-layer panel.
Figure 2:
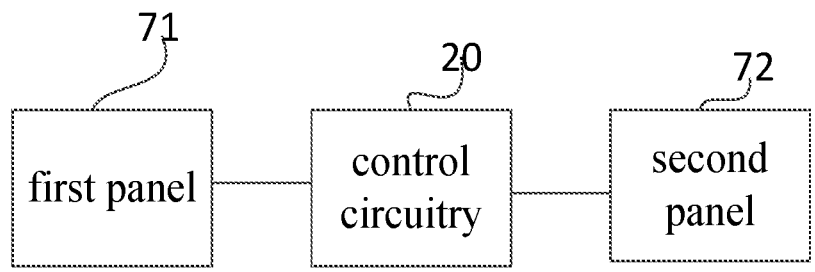
FIG. 2 is a schematic view showing a driving control module according to one embodiment of the present disclosure.

The present disclosure provides in some embodiments a driving control module for a double-layer panel. The double-layer panel includes a first panel and a second panel, the first panel is a touch display panel, and the second panel is a display panel. As shown in FIG. 2, the driving control module includes a control circuitry 20, the control circuitry 20 is electrically coupled to the first panel 71 and the second panel 72, and configured to control a touch stage of the first panel to be arranged within a spacing stage of the second panel, the first panel is configured to perform touch detection in the touch stage, and the spacing stage includes at least one of a scanning blank stage, a frame start time of image display time period, and a frame end time of the image display time period.

In the embodiments of the present disclosure, the scanning blank stage includes an inter-frame blank time period and an intra-frame blank time period. The inter-frame blank time period refers to a blank time period between display time periods of two images. The intra-frame blank time period refers to a blank time period between two adjacent display stages when at least two display stages are arranged within the image display time period. The second panel does not perform display driving during the inter-frame blank time period and the intra-frame blank time period.

In the embodiments of the present disclosure, the frame start time of the image display time period refers to a time where first M gate lines are enabled in the image display time period, where M is a positive integer. The frame end time of the image display time period refers to a time where last M gate lines are enabled in the image display time period.

In the embodiments of the present disclosure, a ratio of the time where the M gate lines are enabled to the image display time period is, but not limited to, less than or equal to 0.05.

According to the embodiments of the present disclosure, the driving control module controls the touch stage of the first panel to be arranged within the spacing stage of the second panel, so that when the first panel 71 performs the touch detection, the second panel 72 stops display driving, so as to prevent the second panel 72 from adversely affecting the touch detection accuracy of the first panel 71 due to the capacitance. Alternatively, the control circuitry controls the second panel 72 to be about to end the display driving when the first panel 71 starts to perform the touch detection. Alternatively, the control circuitry controls the second panel 72 to just start the display driving when the first panel 71 ends the touch detection, i.e., the touch stage at least partially coincides with the frame start time of the second panel 72 or the frame end time of the second panel 72, so as to prevent the second panel 72 from adversely affecting the touch detection accuracy of the first panel 71 due to the capacitance.

In the embodiments of the present disclosure, the first panel 71 and the second panel 72 are attached to each other to form the double-layer panel (BD Cell). The first panel 71 and the second panel 72 are close to each other, so a capacitor is formed between the first panel 71 and the second panel 72. When a voltage applied to the second panel 72 changes, a voltage applied to the first panel also changes due to the capacitance coupling. A touch detection principle of the first panel 71 is to detect the change in the voltage to obtain the change in a capacitance value, and then to obtain touch coordinates. The accuracy of the touch detection will be greatly affected by the second panel 72 during the detection, and even touch malfunction may occur. Based on this, during the operation of the driving control module in the embodiments of the present disclosure, when the first panel 71 performs the touch detection, the control circuitry 20 controls the second panel 72 to stop the display driving, or controls the second panel 72 to just start the display driving or to be about to end the display driving, so as to enable the second panel 72 not to perform a gate scanning operation or a source scanning operation or enable the second panel 72 to be in the frame start time or the frame end time when the first panel 71 performs the touch detection, thereby to prevent or improve the influence of the second panel 72 on the touch detection accuracy of the first panel 71 due to the capacitance.

In the embodiments of the present disclosure, the first panel may be, but not limited to, a Touch and Display Driver Integration (TDDI) panel. The TDDI panel is a self-capacitive touch display panel, and a common electrode also serves as a touch electrode.

In the embodiments of the present disclosure, the spacing stage includes the scanning blank stage, the scanning blank stage includes an inter-frame blank time period, and the control circuitry is configured to control the first panel to perform the touch detection in the touch stage in an inter-frame blank time period of the first panel and control the inter-frame blank time period of the first panel to at least partially overlap the inter-frame blank time period of the second panel.

During the implementation, the first panel performs the touch detection in the touch stage in the inter-frame blank time period, and the inter-frame blank time period of the first panel at least partially overlaps the inter-frame blank time period of the second panel, i.e., the inter-frame blank time period of the first panel coincides with the inter-frame blank time period of the second panel, or a time interval between the time periods is short.

In the embodiments of the present disclosure, a refresh rate of the first panel, a touch frequency of the first panel, and a refresh rate of the second panel may be equal to each other, e.g., it may be, but not limited to, 60 Hz.

In the embodiments of the present disclosure, the refresh rate of the first panel may not be equal to the refresh rate of the second panel, and the touch frequency of the first panel may be equal to the refresh rate of the second panel. For example, the refresh rate of the first panel may be 120 Hz, the refresh rate of the second panel may be 60 Hz, and the touch frequency of the first panel may also be 60 Hz, so as to control the first panel to perform the touch detection in the inter-frame blank time period of the second panel.

In a possible embodiment of the present disclosure, the control circuitry is configured to control the refresh rate of the first panel to be the same as the refresh rate of the second panel, and control frame synchronization between the first panel and the second panel, so as to enable the touch stage of the first panel to at least partially overlap the inter-frame blank time period of the second panel or provide a short time interval between the touch stage and the inter-frame blank time period of the second panel.

For example, the refresh rate of the first panel and the refresh rate of the second panel may both be, but not limited to, 60 Hz, and the touch frequency of the first panel may be, but not limited to, 60 Hz.

In the embodiments of the present disclosure, for the frame synchronization between the first panel and the second panel, the inter-frame blank time period of the first panel coincides with, but not limited to, the inter-frame blank time period of the second panel, or the time interval between the inter-frame blank time period of the first panel and the inter-frame blank time period of the second panel is, but not limited to, less than a predetermined time.

During the implementation, a ratio of the predetermined time to the image display time period may be, but not limited to, less than or equal to 0.05.

In a possible embodiment of the present disclosure, the control circuitry is specifically configured to control the inter-frame blank time period of the first panel to coincide with the inter-frame blank time period of the second panel, so as to enable the touch stage of the first panel to be arranged within the inter-frame blank time period of the second panel, and control the second panel to stop the display driving when the first panel performs the touch detection, thereby to prevent the second panel from adversely affecting the touch detection accuracy of the first panel due to the capacitance.

In another possible embodiment of the present disclosure, the spacing stage includes the frame start time of the image display time period or the frame end time of the image display time period. The control circuitry is specifically configured to control the time interval between the scanning start time of the first panel and the scanning start time of the second panel to be less than or equal to a first error time.

In the embodiments of the present disclosure, a ratio of the first error time to the image display time period is, but not limited to, less than or equal to 0.05.

In the embodiments of the present disclosure, the scanning start time is, but not limited to, a start time of the image display time period.

During the implementation, a ratio of a duration of the touch stage to a duration of the inter-frame blank time period is greater than or equal to 0.2 and less than or equal to 0.6. The touch stage is arranged within the inter-frame blank time period of the first panel, and a ratio of a time difference between a start time of the touch stage and a start time of the inter-frame blank time period to the duration of the inter-frame blank time period is less than or equal to 0.4.

Figure 3:
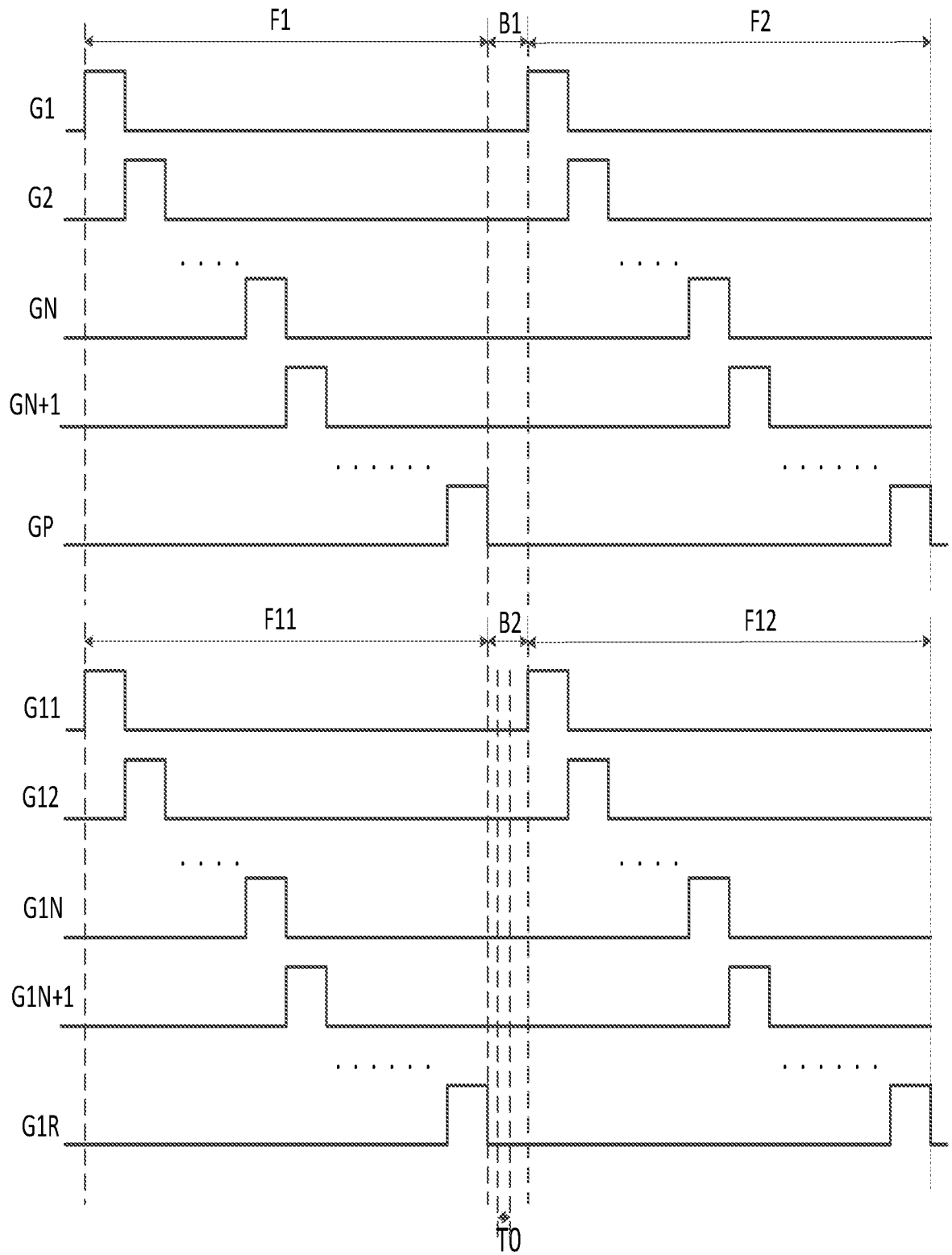
FIG. 3 is a sequence diagram of an inter-frame blank time period B2 of a first panel, an inter-frame blank time period B1 of a second panel, and a touch stage T0 of the first panel according to one embodiment of the present disclosure.

As shown in FIG. 3, when the refresh rate of the first panel is the same as the refresh rate of the second panel and the inter-frame blank time period B2 of the first panel coincides with the inter-frame blank time period B1 of the second panel, the touch stage T0 of the first panel is arranged within the inter-frame blank time period B2 of the first panel, and the touch stage T0 of the first panel is arranged within the inter-frame blank time period B1 of the second panel.

Figure 4:
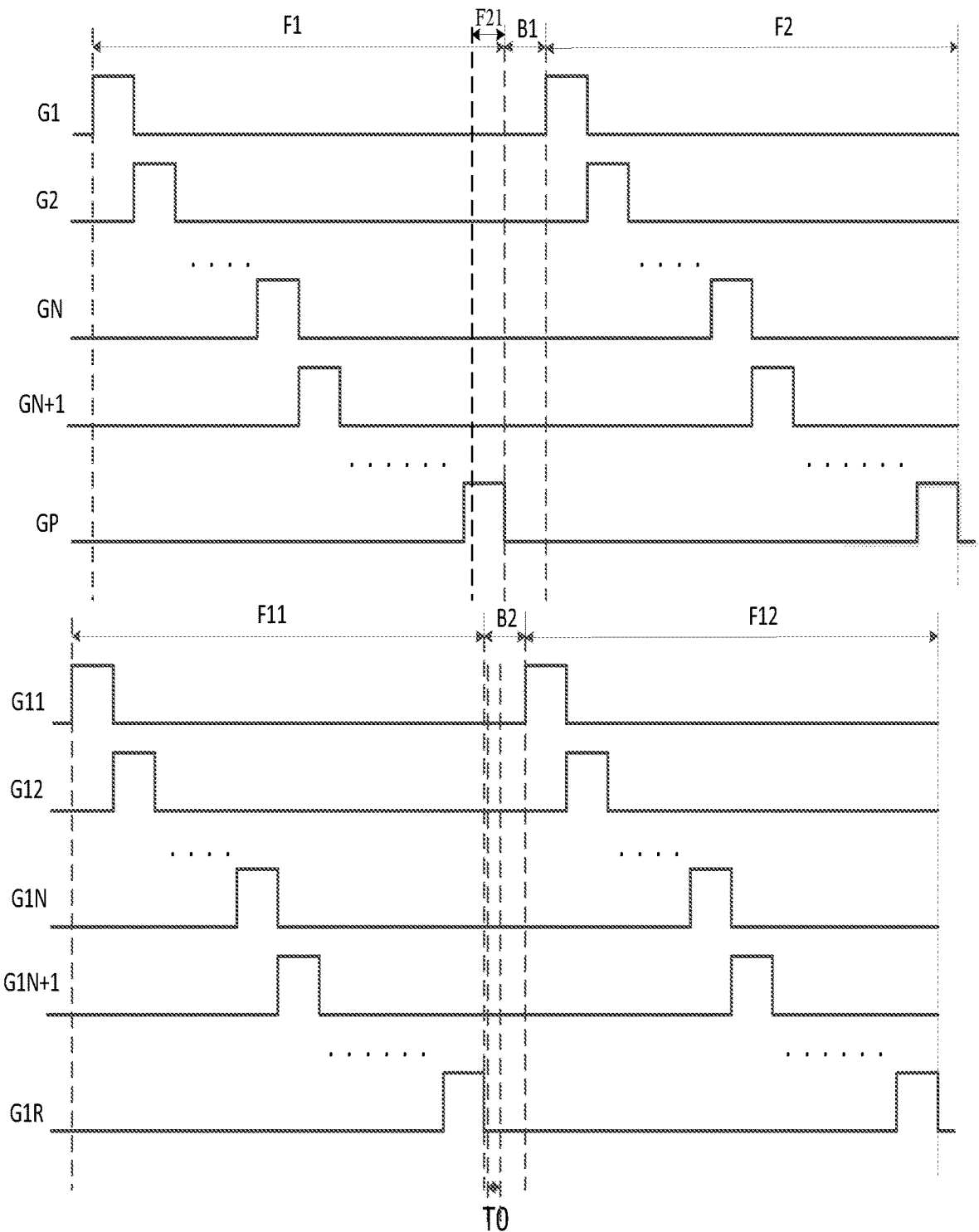
FIG. 4 is another sequence diagram of the inter-frame blank time period B2 of the first panel, the inter-frame blank time period B1 of the second panel, and the touch stage T0 of the first panel according to one embodiment of the present disclosure.

As shown in FIG. 4, the refresh rate of the first panel is the same as the refresh rate of the second panel (e.g., both of the refresh rates may be 60 Hz), the touch stage T0 of the first panel is arranged within the inter-frame blank time period B2 of the first panel. The time interval between the inter-frame blank time period B2 of the first panel and the inter-frame blank time period B1 of the second panel may be 592 µs (i.e., B1 is 592 µs later that B2), and T0 is arranged within the frame end time F21 of the second panel.

During the implementation, the time interval between B2 and B1 may refer to a time interval between the start time of B2 and the start time of B1.

Figure 5:
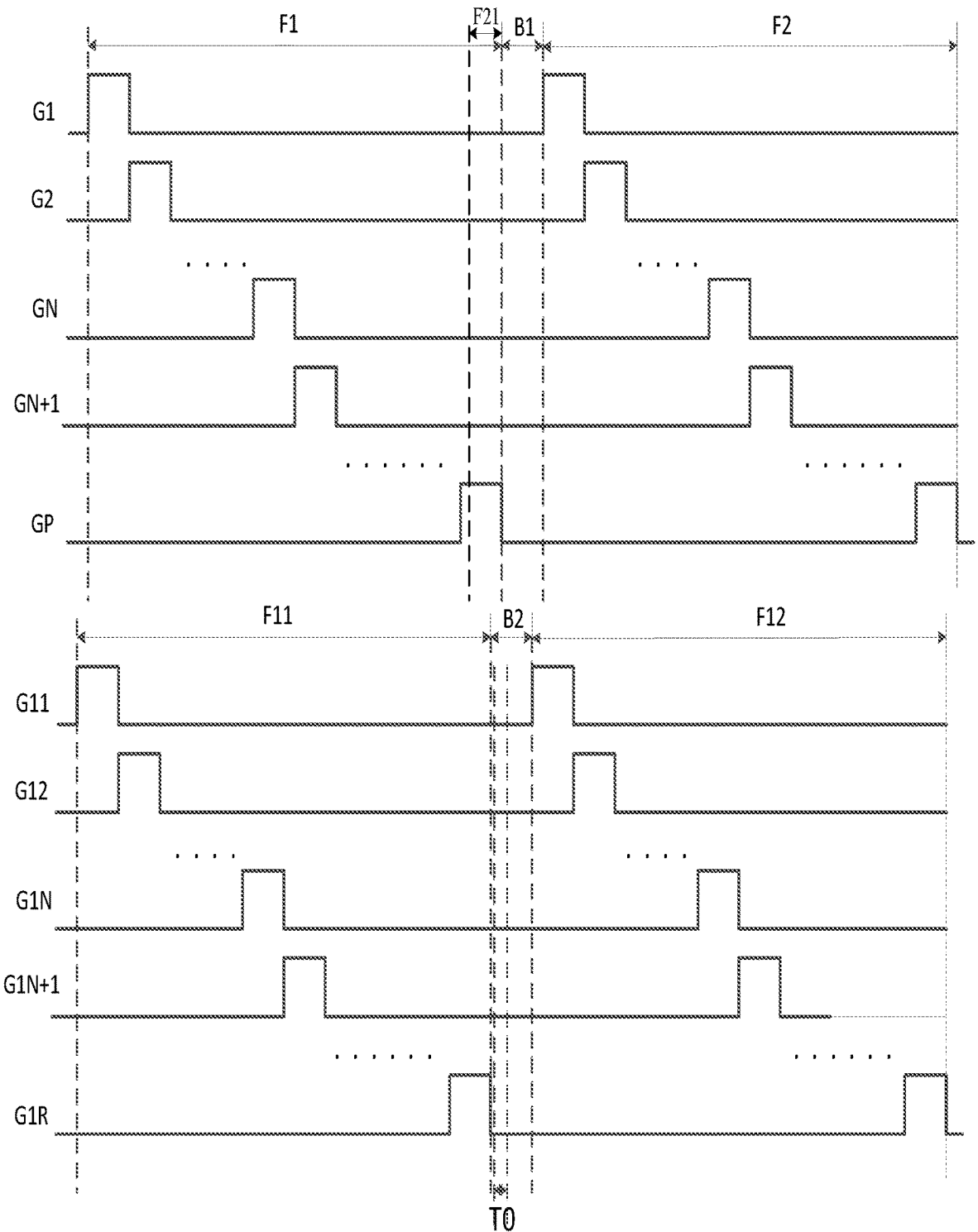
FIG. 5 is yet another sequence diagram of the inter-frame blank time period B2 of the first panel, the inter-frame blank time period B1 of the second panel, and the touch stage T0 of the first panel according to one embodiment of the present disclosure.

As shown in FIG. 5, the refresh rate of the first panel is the same as the refresh rate of the second panel (e.g., both of the refresh rates may be 60 Hz), the touch stage T0 of the first panel is arranged within the inter-frame blank time period B2 of the first panel. The inter-frame blank time period B2 of the first panel and the inter-frame blank time period B1 of the second panel may be spaced from each other by a certain time (B1 is later than B2 by a certain time), a part of T0 is arranged within the frame end time F21 of the second panel, and the other part of T0 is arranged within the inter-frame blank time period B1 of the first panel.

Figure 6:
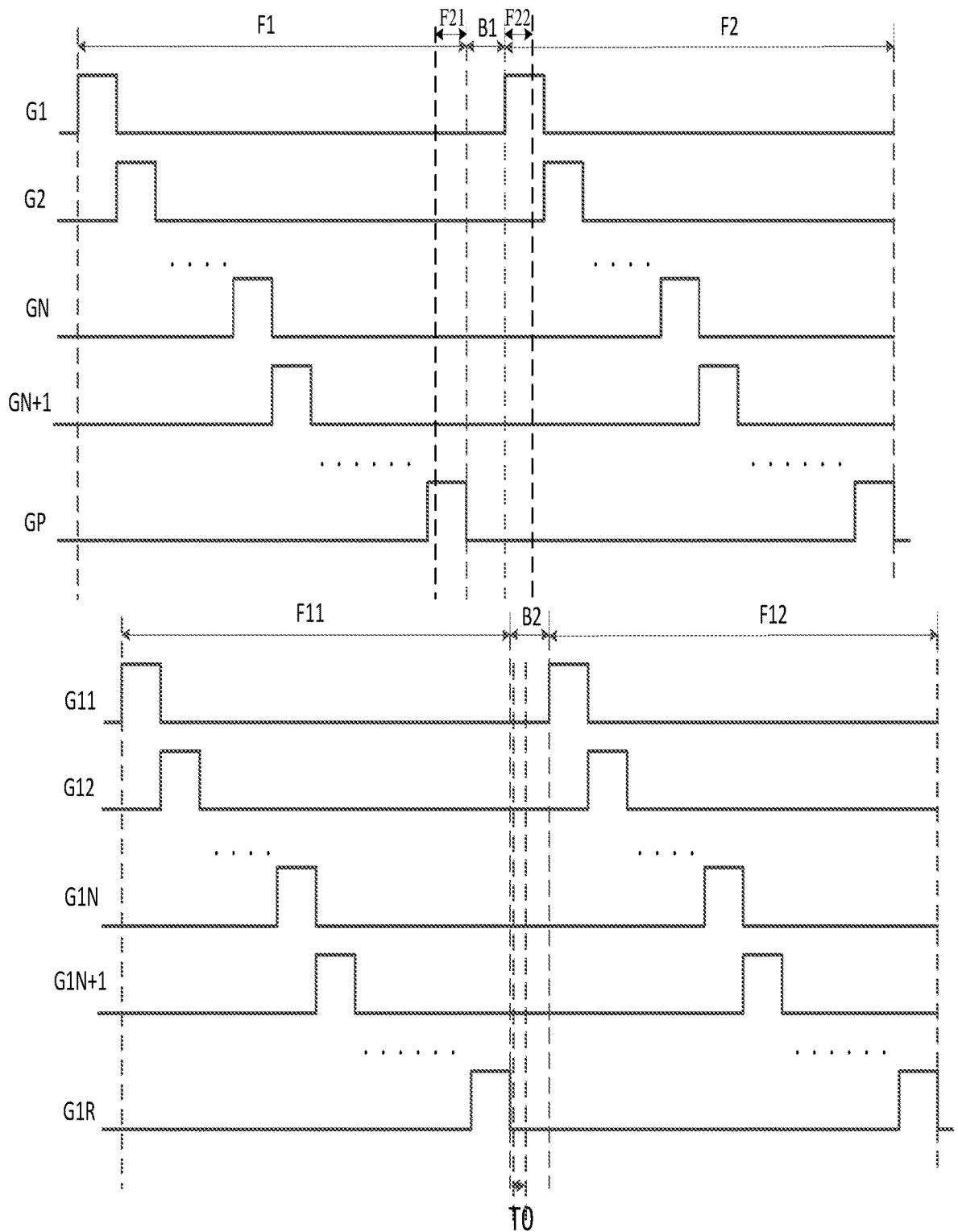
FIG. 6 is still yet another sequence diagram of the inter-frame blank time period B2 of the first panel, the inter-frame blank time period B1 of the second panel, and the touch stage T0 of the first panel according to one embodiment of the present disclosure.

As shown in FIG. 6, the refresh rate of the first panel is the same as the refresh rate of the second panel (e.g., both of the refresh rates may be 60 Hz), the touch stage T0 of the first panel is arranged within the inter-frame blank time period B2 of the first panel. The inter-frame blank time period B2 of the first panel and the inter-frame blank time period B1 of the second panel may be spaced from each other by a certain time (B2 is later than B1 by a certain time), and T0 is arranged within the frame start time F22 of the second panel.

Figure 7:
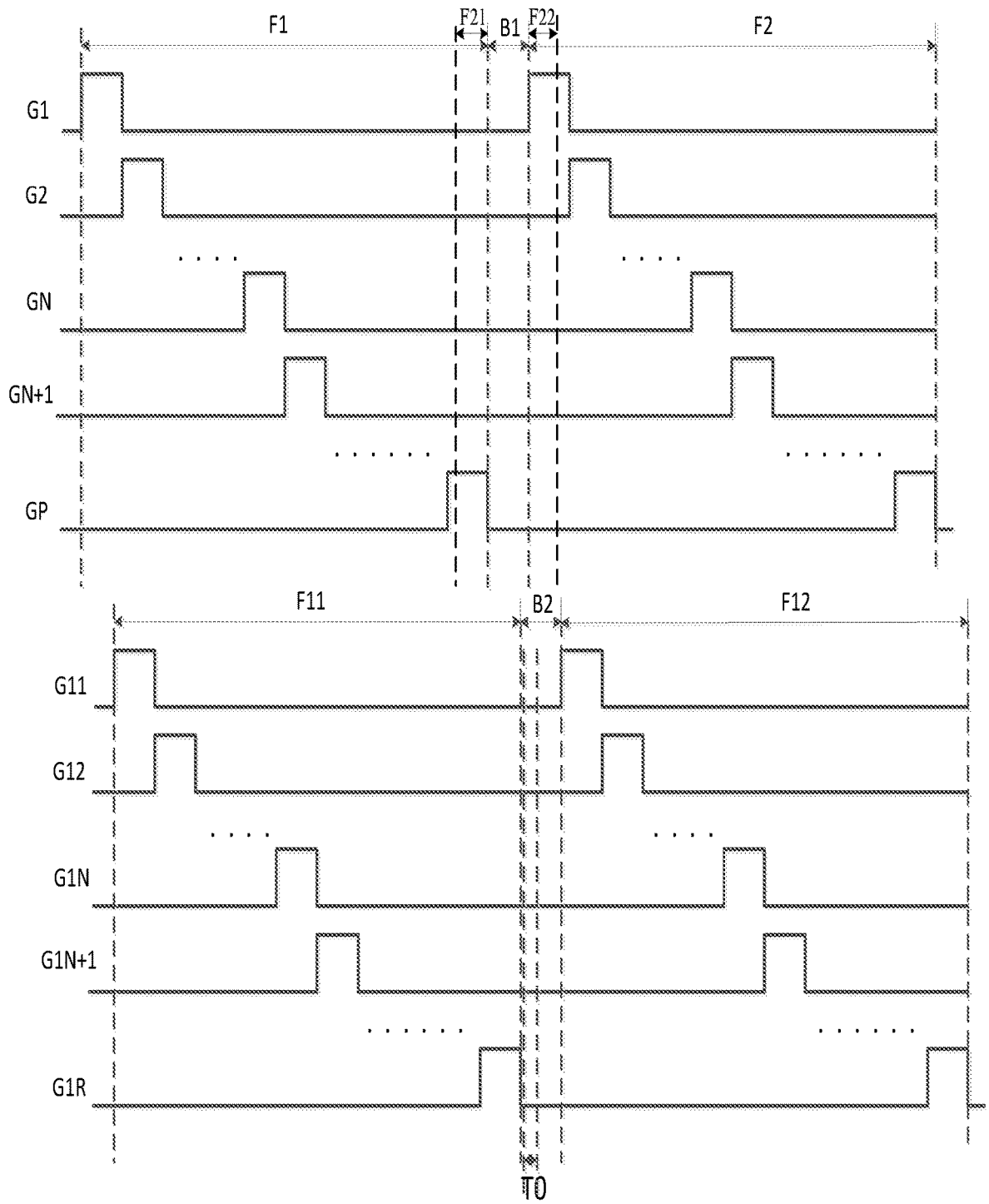
FIG. 7 is still yet another sequence diagram of the inter-frame blank time period B2 of the first panel, the inter-frame blank time period B1 of the second panel, and the touch stage T0 of the first panel according to one embodiment of the present disclosure.

As shown in FIG. 7, the refresh rate of the first panel is the same as the refresh rate of the second panel (e.g., both of the refresh rates may be 60 Hz), the touch stage T0 of the first panel is arranged within the inter-frame blank time period B2 of the first panel. The inter-frame blank time period B2 of the first panel and the inter-frame blank time period B1 of the second panel may be spaced from each other by a certain time (B2 is later than B1 by a certain time), a part of T0 is arranged within the frame end time F22 of the second panel, and the other part of T0 is arranged within the inter-frame blank time period B1 of the first panel.

As shown in FIG. 3 to FIG. 7, F1 represents a first image display time period of the second panel, F2 represents a second image display time period of the second panel, B1 represents the inter-frame blank time period of the second panel between F1 and F2, and in the inter-frame blank time period B1, all the gate lines in the second panel may be disabled. When the touch stage T0 of the first panel is arranged within the inter-frame blank time period B1, a second driving control circuitry controls to sequentially provide corresponding gate driving signals to the plurality of gate lines in the second panel after the touch stage T0 has been ended and F2 has been started.

As shown in FIG. 3 to FIG. 7, F11 represents a first image display time period of the first panel, F12 represents a second image display time period of the first panel, and B2 represents the inter-frame blank time period of the first panel between F11 and F12.

In FIG. 3 to FIG. 7, G1 represents a first gate line in the second panel, G2 represents a second gate line in the second panel, GN represents an $N^{th}$ gate line in the second panel, GN+1 represents an $(N+1)^{th}$ gate line in the second panel, GP represents a $P^{th}$ gate line in the second panel, where P is greater than N+1 and P is a positive integer, and the second panel includes P gate lines.

In FIG. 3 to FIG. 7, G11 represents a first gate line in the first panel, G12 represents a second gate line in the first panel, G1N represents an $N^{th}$ gate line in the first panel, G1N+1 represents an $(N+1)^{th}$ gate line in the first panel, G1R represents an $R^{th}$ gate line in the first panel, where R is greater than N+1 and R is a positive integer, and the first panel includes R gate lines.

In a possible embodiment of the present disclosure, the control circuitry is configured to control the second 72 panel to stop display driving when the first panel 71 performs the touch detection.

In the embodiments of the present disclosure, the driving control module controls the second panel 72 to stop the display driving when the first panel 71 performs the touch detection. In this way, it is able to prevent the second panel 72 from adversely affecting the touch detection accuracy of the first panel 71 due to the capacitance.

During the operation of the driving control module in the embodiments of the present disclosure, when the first panel 71 performs the touch detection, the control circuitry 20 controls the second panel 72 to stop the display driving, so that the second panel 72 pauses the gate scanning operation and the source scanning operation. In this way, the second panel 72 does not perform any gate scanning operation or source scanning operation when the first panel 71 performs the touch detection, so it is able to prevent the second panel 72 from adversely affecting the touch detection accuracy of the first panel 71 due to the capacitance.

During the implementation, the control circuitry 20 is further configured to control the second panel 72 to continue displaying a current image when the first panel 71 performs the touch detection and control to continue scanning the second panel 72 from a gate line to be scanned in the second panel when the first panel 71 enters a display stage. The gate line to be scanned is a gate line after a last scanned gate line in the second panel 72 before the first panel 71 performs the touch detection.

When the first panel 71 performs the touch detection, the second panel 72 continues to display the current image, and when the first panel 71 enters the display stage from a touch detection state, the control circuitry 20 controls the second panel 72 to continue performing display driving and controls to continue performing gate driving scanning from the gate line to be scanned in the second panel 72, so as to improve a display effect of the second panel 72.

In the embodiments of the present disclosure, when the last scanned gate line is a last gate line in the second panel 72, the gate line to be scanned is the first gate line in the second panel 72; and when the last scanned gate line is the $N^{th}$ gate line in the second panel 72, the gate line to be scanned is the N+$1^{th}$ gate line in the second panel 72, where N is a positive integer.

In a possible embodiment of the present disclosure, the control circuitry 20 is configured to control the first panel 71 to perform the touch detection in an inter-frame blank time period between display time periods of two images.

In the embodiments of the present disclosure, in the inter-frame blank time period, the control circuitry 20 controls the first panel 71 to perform touch detection and controls the second panel 72 to stop display driving, so as to prevent the second panel 72 from adversely affecting the touch detection accuracy of the first panel 71.

During the implementation, the control circuitry 20 is configured to control the first panel 71 and the second panel 72 to be in the inter-frame blank time period at the same time, so that the second panel 72 does not perform any display driving operation in the inter-frame blank time period. At this time, the first panel 71 may be controlled by the control circuitry 20 to perform the touch detection in the inter-frame blank time period. In this way, it is able to improve the touch detection accuracy of the first panel 71 without affecting the display effect of the second panel 72 even if a driving Integrated Circuit (IC) has no display maintenance function.

Figure 8:
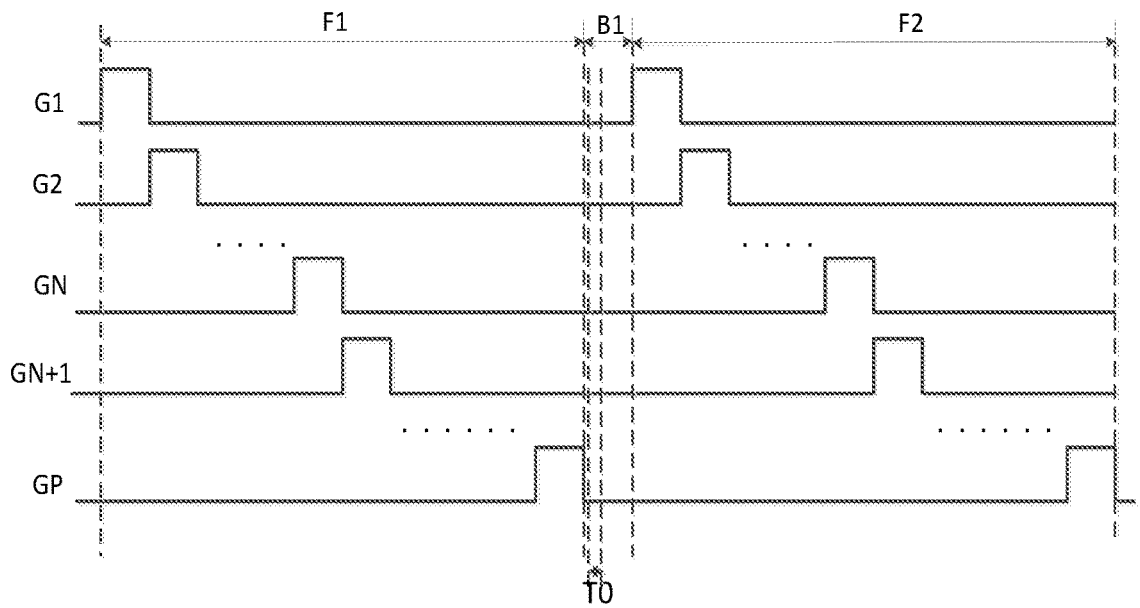
FIG. 8 is a waveform diagram showing gate driving signals on gate lines and voltage signals on data lines during the touch period T0, before the touch period T0, and after the touch period T0 according to one embodiment of the present disclosure.

As shown in FIG. 8, F1 represents a first image display time period of the second panel, F2 represents a second image display time period of the second panel, B1 represents the inter-frame blank time period of the second panel between F1 and F2, and in the inter-frame blank time period B1, all the gate lines in the second panel may be disabled. When the touch stage T0 of the first panel is arranged within the inter-frame blank time period B1, a second driving control circuitry controls to sequentially provide corresponding gate driving signals to the plurality of gate lines in the second panel after the touch stage T0 has been ended and the F2 has been started.

In FIG. 8, G1 represents a first gate line in the second panel, G2 represents a second gate line in the second panel, GN represents an $N^{th}$ gate line in the second panel, GN+1 represents an $(N+1)^{th}$ gate line in the second panel, GP represents a $P^{th}$ gate line in the second panel, where P is greater than N+1 and P is a positive integer, and the second panel includes P gate lines.

Figure 9:
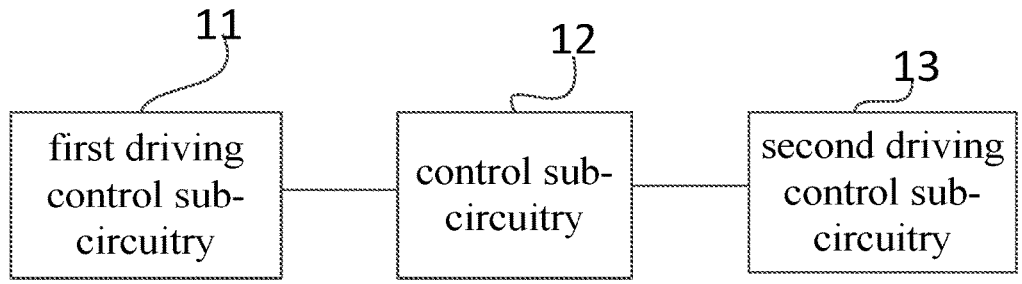
FIG. 9 is a schematic view showing a control circuitry in the driving control module according to one embodiment of the present disclosure.

As shown in FIG. 9, the control circuitry includes a first driving control sub-circuitry 11, a control sub-circuitry 12 and a second driving control sub-circuitry 13. The first driving control sub-circuitry 11 is electrically coupled to the first panel 71, and configured to output a touch indication signal in accordance with a touch state of the first panel 71. The control sub-circuitry 12 is electrically coupled to the first driving control sub-circuitry 11 and the second driving control sub-circuitry 13, and configured to receive the touch indication signal, provide a driving stop control signal to the second driving control sub-circuitry 13 when the touch indication signal indicates the first panel 71 to enter the touch stage, and provide a driving control signal to the second driving control sub-circuitry 13 when the touch indication signal indicates the first panel 71 to enter the display stage. The second driving control sub-circuitry 13 is electrically coupled to the second panel 72, and configured to receive the driving stop control signal and the driving control signal, control to stop scanning all the gate lines in the second panel 72 in response to the driving stop control signal, and record a serial number N of the last scanned gate line in the second panel before the reception of the driving stop control signal, and control to continue scanning from an $(N+1)^{th}$ gate line in the second panel in response to the driving control signal, where N is a positive integer.

In FIG. 9, the spacing stage may include, but not limited to, the scanning blank stage, and the scanning blank stage may be, but not limited to, the intra-frame blank time period.

During the operation of the driving control module in the embodiments of the present disclosure, the first driving control sub-circuitry 11 outputs the touch indication signal in accordance with the touch state, and the control sub-circuitry 12 provides the driving stop control signal or the driving control signal to the second driving control sub-circuitry 13 in accordance with the touch indication signal. The second driving control sub-circuitry 13 receives the driving stop control signal or the driving control signal, the second driving control sub-circuitry 13 controls all the gate lines in the second panel 72 to be disabled and records the serial number N in response to the driving stop control signal, and the second driving sub-circuitry 13 controls to continue scanning from the (N+1)$^{th}$ gate line in the second panel 72 in response to the driving control signal. According to the driving control module in the embodiments of the present disclosure, it is able to reduce the influence of the second panel on the touch accuracy of the first panel.

During the operation of the driving control module in the embodiments of the present disclosure, when the second driving control sub-circuitry 13 receives the driving stop control signal, the second driving control sub-circuitry controls all the gate lines in the second panel 72 to be disabled, and the second panel 72 pauses the gate scanning operation and the source scanning operation. In this way, it is able to prevent the second panel 72 from performing any gate scanning operation or source scanning operation when the first panel 71 performs the touch detection, thereby to prevent the second panel 72 from adversely affecting touch detection accuracy of the first panel 71 due to the capacitance.

In the embodiments of the present disclosure, a display maintenance function is added to a driving IC of the second panel, so as to, when the first panel performs the touch detection, enable the second panel to pause the gate scanning operation and the source scanning operation. In addition, when the first panel stops the touch detection, the second panel is controlled to continue performing the display driving, i.e., to perform the gate scanning operation and the source scanning operation from the gate line to be scanned in the second panel.

During the implementation, the first driving control sub-circuitry 11 is configured to continuously detect the touch state of the first panel 71 after the first panel 71 has been started.

In actual use, after the first panel 71 has been started, the first driving control sub-circuitry 11 may continuously detect the touch state of the first panel, so as to control gate line scanning operation of the second panel 72 in real time in accordance with the touch state, thereby to improve the touch detection accuracy of the first panel.

In the embodiments of the present disclosure, the second driving control sub-circuitry is specifically configured to provide a first voltage signal to all the gate lines in the second panel in response to the driving stop control signal, so as to control all the gate lines to be disabled and control to stop providing data voltage to all data lines in the second panel.

In actual use, after the second driving control sub-circuitry has received the driving stop control signal, the first voltage signal is provided to the gate lines in the second panel, and the data voltage is stopped from providing to all the data lines in the second panel, so as to reduce the influence on the touch detection operation of the first panel.

During the implementation, the first voltage signal may be a direct current voltage signal. When the first voltage signal provided to the gate lines in the second panel is a direct current voltage signal, it is able to prevent the occurrence of any voltage fluctuation, thereby to prevent the touch detection operation of the first panel from being adversely affected.

Figure 10:
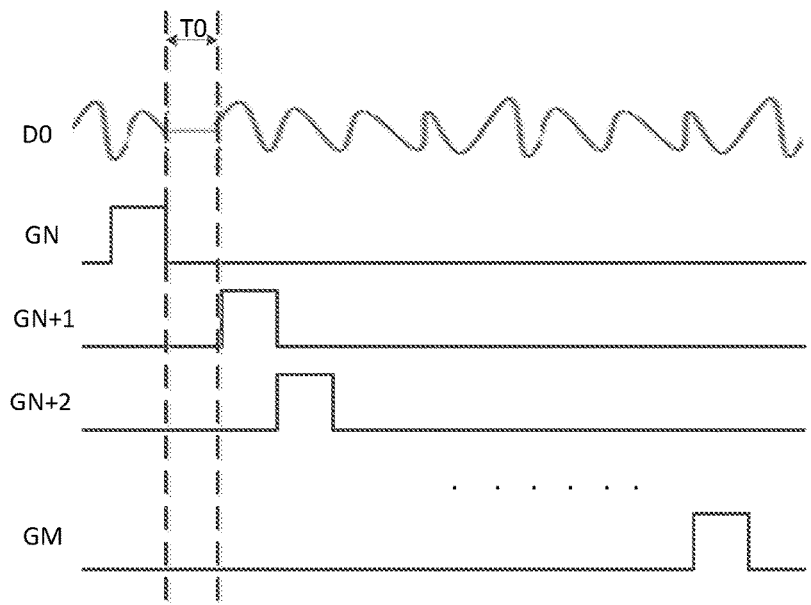
FIG. 10 is a schematic view showing synchronous change in a touch driving signal TP on a touch driving line in the first panel, a gate driving signal on a gate line in the second panel, and a voltage signal on a data line in the second panel in the touch stage T0.

As shown in FIG. 10, T0 represents the touch stage (i.e., the touch stage is a time period during which the first panel performs the touch detection). Before T0, the N$^{th}$ gate line GN in the second panel is enabled (i.e., GN outputs a high voltage, and a transistor in a pixel circuitry in the second panel, a gate electrode of which is electrically coupled to the gate line, is an n-type transistor). In the touch stage T0, all the gate lines in the second panel are disabled (i.e., all the gate lines output a low voltage), and a data line D0 in the second panel does not provide any data voltage. After the touch stage T0 has been finished, the scanning operation is started from the (N+1)$^{th}$ gate line GN+1 of the second panel.

In FIG. 10, GN+1 represents the (N+1)$^{th}$ gate line in the second panel, and GM represents an M$^{th}$ gate line in the second panel, where M is a positive integer and is greater than N+1.

In the embodiments of the present disclosure, the second driving control sub-circuitry is specifically configured to, in response to the driving stop control signal, control to provide a predetermined gate driving signal to all the gate lines in the second panel, and control to provide a predetermined voltage signal to all data lines in the second panel. The predetermined gate driving signal is a signal generated through superposing a second voltage signal on the touch driving signal, the predetermined voltage signal is a signal generated through superposing a third voltage signal on the touch driving signal, and the touch driving signal is a signal on a touch driving line in the first panel when the first panel is in the touch state.

In a possible embodiment of the present disclosure, when the driving stop control signal has been received (i.e., when the first panel is in the touch stage), the gate driving signal on the gate line in the second panel and the voltage signal on the data line in the second panel change synchronously with the touch driving signal on a touch driving line of the first panel, so as to reduce the influence of the voltage change on the second panel on the touch operation of the first panel.

During the implementation, the second voltage signal and the third voltage signal may be, but not limited to, direct current voltage signals.

As shown in FIG. 11, in the touch stage T0, the touch driving signal TP on the touch driving line in the first panel is a square wave signal, and at this time, the gate driving signal on the gate line in the second panel and the voltage signal on the data line in the second panel change synchronously with TP. In FIG. 11, merely the gate driving signal on the N$^{th}$ gate line GN and the voltage signal on the data line D0 are shown. In actual use, in the touch stage T0, gate driving signals on the other gate lines in the second panel may be, but not limited to, the same as the gate driving signal on GN, and voltage signals on the other data lines in the second panel may be, but not limited to, the same as the voltage signal on D0.

For example, in the touch stage T0, a potential of TP may be, but not limited to, switched between 4V and 0V, a potential of GN may be, but not limited to, switched between 6V and 2V, and a potential of D0 may be, but not limited to, switched between −4V and −8V.

In the embodiments of the present disclosure, the control circuitry is further configured to control the first panel to be started and control the second panel to be started after the first panel has been started when the double-layer panel is started.

During the implementation, the double-layer panel is started in a time-division manner, i.e., the first panel is started before the second panel. When the double-layer panel is started, the first panel performs reference value calibration. When the second panel has been started, the first panel is interfered, and thereby the reference value calibration of the first panel is not accurate. In this regard, when the double-layer panel is started, the control circuitry controls to start the first panel, and start the second panel after the first panel has been started.

The present disclosure further provides in some embodiments a driving control method for the above-mentioned driving control module, including controlling, by the control circuitry, the touch stage of the first panel to be arranged within the spacing stage of the second panel. The spacing stage includes at least one of the scanning blank stage, the frame start time of the image display time period, and the frame end time of the image display time period.

In the embodiments of the present disclosure, the scanning blank stage includes an inter-frame blank time period and an intra-frame blank time period. The inter-frame blank time period refers to a blank time period between display time periods of two images. The intra-frame blank time period refers to a blank time period between two adjacent display stages when at least two display stages are arranged within the image display time period. The second panel does not perform display driving during the inter-frame blank time period and the intra-frame blank time period.

In the embodiments of the present disclosure, the frame start time of the image display time period refers to a time where first M gate lines are enabled in the image display time period, where M is a positive integer. The frame end time of the image display time period refers to a time where last M gate lines are enabled in the image display time period.

In the embodiments of the present disclosure, a ratio of the time where the M gate lines are enabled to the image display time period is, but not limited to, less than or equal to 0.05.

According to the driving control method in the embodiments of the present disclosure, the driving control module controls the touch stage of the first panel to be arranged within the spacing stage of the second panel, so that when the first panel performs the touch detection, the second panel stops display driving, so as to prevent the second panel from adversely affecting the touch detection accuracy of the first panel due to the capacitance. Alternatively, the control circuitry controls the second panel to be about to end the display driving when the first panel starts to perform the touch detection. Alternatively, the control circuitry controls the second panel to just start the display driving when the first panel ends the touch detection, i.e., the touch stage at least partially coincides with the frame start time of the second panel or the frame end time of the second panel, so as to prevent the second panel from adversely affecting the touch detection accuracy of the first panel due to the capacitance.

In a possible embodiment of the present disclosure, the spacing stage includes the scanning blank stage, the scanning blank stage includes the inter-frame blank time period, and the driving control method further includes controlling, by the control circuitry, the first panel to perform the touch detection in the touch stage in the inter-frame blank time period of the first panel, and controlling the inter-frame blank time period of the first panel to at least partially overlap the inter-frame blank time period of the second panel.

During the implementation, the first panel performs the touch detection in the touch stage in the inter-frame blank time period, and the inter-frame blank time period of the first panel at least partially overlaps the inter-frame blank time period of the second panel, i.e., the inter-frame blank time period of the first panel coincides with the inter-frame blank time period of the second panel, or a time interval between the time periods is short.

In a possible embodiment of the present disclosure, the driving control method further includes controlling, by the control circuitry, the refresh rate of the first panel to be the same as the refresh rate of the second panel, and controlling the frame synchronization between the first panel and the second panel, so as to enable the touch stage of the first panel to at least partially overlap the inter-frame blank time period of the second panel or provide a short time interval between the touch stage and the inter-frame blank time period of the second panel.

For example, the refresh rate of the first panel and the refresh rate of the second panel may both be, but not limited to, 60 Hz, and the touch frequency of the first panel may be, but not limited to, 60 Hz.

In the embodiments of the present disclosure, for the frame synchronization between the first panel and the second panel, the inter-frame blank time period of the first panel coincides with, but not limited to, the inter-frame blank time period of the second panel, or the time interval between the inter-frame blank time period of the first panel and the inter-frame blank time period of the second panel is, but not limited to, less than a predetermined time.

In a possible embodiment of the present disclosure, the driving control method further includes controlling, by the control circuitry, the second panel to stop display driving when the first panel performs the touch detection.

In the embodiments of the present disclosure, the control circuitry controls the second panel to stop the display driving when the first panel performs the touch detection, so as to control the second panel to stop the display driving when the first panel performs the touch detection, thereby to prevent the second panel from adversely affecting the touch detection accuracy of the first panel due to the capacitance.

In a possible embodiment of the present disclosure, the driving control method further includes controlling, by the control circuitry, the second panel to continue displaying a current image when the first panel performs the touch detection and controlling, by the control circuitry, to continue scanning the second panel from a gate line to be scanned in the second panel when the first panel enters a display stage, and the gate line to be scanned is a gate line after a last scanned gate line in the second panel before the first panel performs the touch detection.

When the first panel performs the touch detection, the second panel continues to display the current image, and when the first panel enters the display stage from a touch detection state, the control circuitry controls the second panel to continue performing the display driving and controls to continue performing the gate driving scanning operation from the gate line to be scanned in the second panel, so as to improve the display effect of the second panel. In a possible embodiment of the present disclosure, the driving control method further includes controlling, by the control circuitry, the first panel to perform the touch detection in the inter-frame blank time period between a display time period of two images.

In the embodiments of the present disclosure, in the inter-frame blank time period, the control circuitry controls the first panel to perform the touch detection and controls the second panel to stop performing the display driving, so as to prevent the second panel from adversely affecting the touch detection accuracy of the first panel.

In the embodiments of the present disclosure, the driving control method further includes controlling, by the control circuitry, the first panel and the second panel to be in the inter-frame blank time period at the same time.

During the implementation, the control circuitry may control the first panel and the second panel to be in the inter-frame blank time period at the same time, so that the second panel does not perform any display driving operation in the inter-frame blank time period. At this time, the first panel may be controlled by the control circuitry to perform the touch detection in the inter-frame blank time period. In this way, it is able to improve the touch detection accuracy of the first panel without affecting the display effect of the second panel even if a driving IC has no display maintenance function.

In a possible embodiment of the present disclosure, the control circuitry includes a first driving control sub-circuitry, a control sub-circuitry and a second driving control sub-circuitry. As shown in FIG. 12, the driving control method includes the following steps.

S1: outputting, by the first driving control sub-circuitry, the touch indication signal in accordance with the touch state of the first panel.

S2: receiving, by the control sub-circuitry, the touch indication signal, providing, by the control sub-circuitry, the driving stop control signal to the second driving control sub-circuitry when the touch indication signal indicates the first panel to enter the touch stage, and providing, by the control sub-circuitry, a driving control signal to the second driving control sub-circuitry when the touch indication signal indicates the first panel to enter the display stage.

S3: controlling, by the second driving control sub-circuitry, to stop scanning all the gate lines in the second panel in response to the received driving stop control signal, recording a serial number N of a last scanned gate line in the second panel before the driving stop control signal is received, and controlling, by the second driving control sub-circuitry, to continue scanning from an $(N+1)^{th}$ gate line in the second panel in response to the driving control signal, where N is a positive integer.

According to the driving control method in the embodiments of the present disclosure, the first driving control sub-circuitry outputs the touch indication signal in accordance with the touch state, and the control sub-circuitry provides the driving stop control signal or the driving control signal to the second driving control sub-circuitry in accordance with the touch indication signal. The second driving control sub-circuitry receives the driving stop control signal or the driving control signal, controls all the gate lines in the second panel to be disabled and records the serial number N in response to the driving stop control signal. The second driving sub-circuitry controls to continue scanning from the $(N+1)^{th}$ gate line in the second panel in response to the driving control signal. According to the driving control module in the embodiments of the present disclosure, it is able to reduce the influence of the second panel on the touch accuracy of the first panel.

In a possible embodiment of the present disclosure, the driving control method further includes detecting, by the first driving control sub-circuitry, the touch state of the first panel continuously after the first panel has been started.

In actual use, after the first panel has been started, the first driving control sub-circuitry may continuously detect the touch state of the first panel, so as to control the gate scanning operation of the second panel in real time in accordance with the touch state, thereby to improve the touch detection accuracy of the first panel.

During the implementation, the controlling, by the second driving control sub-circuitry, to stop scanning all the gate lines in the second panel in response to the driving stop control signal includes, in response to the driving stop control signal, controlling, by the second driving control sub-circuitry, to provide a first voltage signal to all the gate lines in the second panel to control to stop scanning all the gate lines, and control to stop providing a data voltage to all data lines in the second panel.

In actual use, after receiving the driving stop control signal, the second driving control sub-circuitry may control to provide a first voltage signal to the gate lines in the second panel, and control to stop providing the data voltage to all the data lines in the second panel, so as to reduce the influence on the touch detection operation of the first panel.

During the implementation, the first voltage signal may be a direct current voltage signal. When the first voltage signal provided to the gate lines in the second panel is a direct current voltage signal, it is able to prevent the occurrence of a voltage fluctuation, thereby to prevent the touch detection operation of the first panel from being adversely affected.

During the implementation, the controlling, by the second driving control sub-circuitry, to stop scanning all the gate lines in the second panel in response to the driving stop control signal includes, in response to the driving stop control signal, controlling, by the second driving control sub-circuitry, to provide a predetermined gate driving signal to all the gate lines in the second panel, and controlling to provide a predetermined voltage signal to all data lines in the second panel. The predetermined gate driving signal is a signal generated through superposing a second voltage signal on the touch driving signal, the predetermined voltage signal is a signal generated through superposing a third voltage signal on the touch driving signal, and the touch driving signal is a signal on a touch driving line in the first panel when the first panel is in the touch state.

In a possible embodiment of the present disclosure, when the driving stop control signal has been received (i.e., when the first panel is in the touch stage), the gate driving signal on the gate line in the second panel and the voltage signal on the data line in the second panel change synchronously with the touch driving signal on a touch driving line of the first panel, so as to reduce the influence of the voltage change on the second panel on the touch operation of the first panel.

In the embodiments of the present disclosure, the second voltage signal and the third voltage signal may be, but not limited to, direct current voltage signals.

In a possible embodiment of the present disclosure, the second voltage signal and the third voltage signal are direct current voltage signals.

In the embodiments of the present disclosure, the driving control method further includes controlling, by the control circuitry, the first panel to be started and control the second panel to be started after the first panel has been started when the double-layer panel is started.

During the implementation, the double-layer panel is started in a time-division manner, i.e., the first panel is started before the second panel. When the double-layer panel is started, the first panel performs reference value calibration. When the second panel has been started, the first panel is interfered, and thereby the reference value calibration of the first panel is not accurate. In this regard, when the double-layer panel is started, the control circuitry controls to start the first panel, and start the second panel after the first panel has been started.

The present disclosure further provides in some embodiments a double-layer panel including the above-mentioned driving control module.

In the embodiments of the present disclosure, the double-layer panel may be applied to a vehicle-mounted display device.

In the embodiments of the present disclosure, the first panel may be, but not limited to, a Low Temperature Polysilicon (LTPS) TDDI panel, and the second panel may be, but not limited to, an amorphous silicon (α-Si) mono display panel (the mono display panel is a display panel without a color film substrate).

In the embodiments of the present disclosure, both the first panel and the second panel are, but not limited to, liquid crystal display panels.

During the implementation, the driving control module may be integrated in a Field Programmable Gate Array (FPGA) chip.

Figure 13:
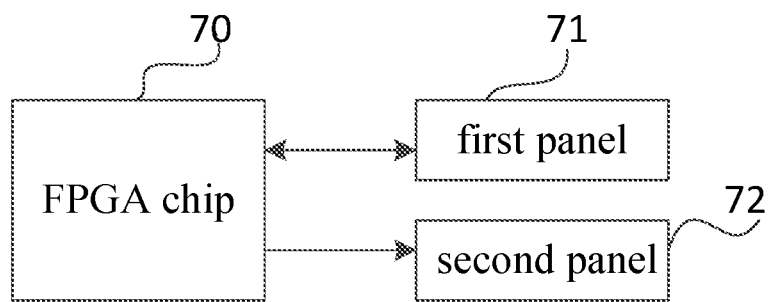
FIG. 13 is a schematic view showing a double-layer panel according to one embodiment of the present disclosure.

As shown in FIG. 13, the double-layer panel in the embodiments of the present disclosure includes a driving control module integrated in an FPGA chip 70, a first panel 71, and a second panel 72. During the operation of the double-layer panel in the embodiments of the present disclosure, the FPGA chip 70 receives image information and provides processed image information to the first panel 71 and the second panel 72. The driving control module in the FPGA chip 70 detects a touch state of the first panel, and provides a driving control signal or a driving stop control signal to the second panel 72 in accordance with the touch state, so as to control the second panel 72 to perform display driving or stop display driving.

The present disclosure further provides in some embodiments a display device including the above-mentioned double-layer panel.

The display device may be any product or member having a display function, such as a vehicle-mounted display device, a mobile phone, a tablet computer, a television, a monitor, a laptop computer, a digital photo frame, or a navigator.

The above embodiments are for illustrative purposes only, it should be appreciated that, a person skilled in the art may make further modifications and improvements without departing from the spirit of the present disclosure, and these modifications and improvements shall also fall within the scope of the present disclosure.

The invention claimed is:

1. A driving control module for a double-layer panel, wherein the double-layer panel comprises a first panel and a second panel, the first panel is a touch display panel, the second panel is a display panel, and the driving control module comprises a control circuitry, wherein the control circuitry is electrically coupled to the first panel and the second panel, and configured to control a touch stage of the first panel to be arranged within a spacing stage of the second panel, the first panel is configured to perform touch detection in the touch stage, and the spacing stage comprises at least one of a scanning blank stage, a frame start time of an image display time period, and a frame end time of the image display time period;

wherein the spacing stage comprises the scanning blank stage, the scanning blank stage comprises an inter-frame blank time period, and the control circuitry is configured to control the first panel to perform the touch detection in the touch stage in an inter-frame blank time period of the first panel and control the inter-frame blank time period of the first panel to at least partially overlap the inter-frame blank time period of the second panel;

wherein the control circuitry is configured to control a refresh rate of the first panel to be the same as a refresh rate of the second panel, and control frame synchronization between the first panel and the second panel;

wherein the control circuitry is specifically configured to control a time interval between a scanning start time of the first panel and a scanning start time of the second panel to be less than or equal to a first error time, and the spacing stage comprises the frame start time of the image display time period or the frame end time of the image display time period.

2. The driving control module according to claim 1, wherein the control circuitry is specifically configured to control the inter-frame blank time period of the first panel to coincide with the inter-frame blank time period of the second panel, so as to enable the touch stage of the first panel to be arranged within the inter-frame blank time period of the second panel.

3. The driving control module according to claim 1, wherein a ratio of the first error time to the image display time period is less than or equal to 0.05.

4. The driving control module according to claim 1, wherein a ratio of a duration of the touch stage to a duration of the inter-frame blank time period is greater than or equal to 0.2 and less than or equal to 0.6, the touch stage is arranged within the inter-frame blank time period of the first panel, and a ratio of a time difference between a start time of the touch stage and a start time of the inter-frame blank time period to the duration of the inter-frame blank time period is less than or equal to 0.4.

5. The driving control module according to claim 1, wherein the control circuitry is specifically configured to control the second panel to stop display driving when the first panel performs the touch detection.

6. The driving control module according to claim 5, wherein t the control circuitry is further configured to control the second panel to continue displaying a current image when the first panel performs the touch detection and control to continue scanning the second panel from a gate line to be scanned in the second panel when the first panel enters a display stage, and the gate line to be scanned is a gate line next to a last scanned gate line in the second panel before the first panel performs the touch detection.

7. The driving control module according to claim 5, wherein the control circuitry comprises a first driving control sub-circuitry, a control sub-circuitry and a second driving control sub-circuitry;

the first driving control sub-circuitry is electrically coupled to the first panel and configured to output a touch indication signal in accordance with a touch state of the first panel;

the control sub-circuitry is electrically coupled to the first driving control sub-circuitry and the second driving control sub-circuitry, and configured to receive the touch indication signal, provide a driving stop control signal to the second driving control sub-circuitry when the touch indication signal indicates the first panel to enter the touch stage, and provide a driving control signal to the second driving control sub-circuitry when the touch indication signal indicates the first panel to enter the display stage; and the second driving control sub-circuitry is electrically coupled to the second panel, and configured to control to stop scanning all gate lines in the second panel in response to the received driving stop control signal, record a serial number N of the last scanned gate line in the second panel before the reception of the driving stop control signal, and control to continue scanning from an (N+1)$^{th}$ gate line in the second panel in response to the driving control signal, where N is a positive integer.

8. The driving control module according to claim 7, wherein the second driving control sub-circuitry is specifically configured to, in response to the driving stop control signal, control to provide a first voltage signal to all the gate lines in the second panel to control to stop scanning all the gate lines, and control to stop providing a data voltage to all data lines in the second panel.

9. The driving control module according to claim 8, wherein the first voltage signal is a direct current voltage signal.

10. The driving control module according to claim 7, wherein the second driving control sub-circuitry is specifically configured to, in response to the driving stop control signal, control to provide a predetermined gate driving signal to all the gate lines in the second panel, and control to provide a predetermined voltage signal to all data lines in the second panel, the predetermined gate driving signal is a signal generated through superposing a second voltage signal on the touch driving signal, the predetermined voltage signal is a signal generated through superposing a third voltage signal on the touch driving signal, and the touch driving signal is a signal on a touch driving line in the first panel when the first panel is in the touch state.

11. The driving control module according to claim 10, wherein the second voltage signal and the third voltage signal are direct current voltage signals.

12. The driving control module according to claim 7, wherein the first driving control sub-circuitry is specifically configured to continuously detect the touch state of the first panel after the first panel has been started.

13. The driving control module according to claim 1, wherein the control circuitry is further configured to control the first panel to be started and control the second panel to be started after the first panel has been started when the double-layer panel is started.

14. A driving control method for the driving control module according to claim 1, comprising controlling, by the control circuitry, the touch stage of the first panel to be arranged within the spacing stage of the second panel, wherein the spacing stage comprises at least one of the scanning blank stage, the frame start time of the image display time period, and the frame end time of the image display time period.

15. The driving control method according to claim 14, wherein the spacing stage comprises the scanning blank stage, the scanning blank stage comprises the inter-frame blank time period, and the driving control method further comprises controlling, by the control circuitry, the first panel to perform the touch detection in the touch stage in the inter-frame blank time period of the first panel, and controlling the inter-frame blank time period of the first panel to at least partially overlap the inter-frame blank time period of the second panel;
wherein the driving control method further comprises controlling, by the control circuitry, the refresh rate of the first panel to be the same as the refresh rate of the second panel, and controlling the frame synchronization between the first panel and the second panel.

16. The driving control method according to claim 14, further comprising controlling, by the control circuitry, the second panel to stop display driving when the first panel performs the touch detection;
wherein the driving control method further comprises controlling, by the control circuitry, the second panel to continue displaying a current image when the first panel performs the touch detection and controlling, by the control circuitry, to continue scanning the second panel from a gate line to be scanned in the second panel when the first panel enters a display stage, wherein the gate line to be scanned is a gate line after a last scanned gate line in the second panel before the first panel performs the touch detection.

17. A double-layer panel, comprising the driving control module according to claim 1.

* * * * *